United States Patent
Ishii et al.

(10) Patent No.: US 8,472,379 B2
(45) Date of Patent: Jun. 25, 2013

(54) MOBILE STATION, RADIO BASE STATION, COMMUNICATION CONTROL METHOD, AND MOBILE COMMUNICATION SYSTEM

(75) Inventors: Hiroyuki Ishii, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 362 days.

(21) Appl. No.: 12/809,782

(22) PCT Filed: Dec. 19, 2008

(86) PCT No.: PCT/JP2008/073220
§ 371 (c)(1),
(2), (4) Date: Aug. 9, 2010

(87) PCT Pub. No.: WO2009/081871
PCT Pub. Date: Jul. 2, 2009

(65) Prior Publication Data
US 2010/0296449 A1    Nov. 25, 2010

(30) Foreign Application Priority Data

Dec. 20, 2007  (JP) ............................... P2007-329125
Dec. 21, 2007  (JP) ............................... P2007-331017
Jan. 11, 2008  (JP) ............................... P2008-005072

(51) Int. Cl.
*H04W 4/00* (2009.01)
*H04W 36/00* (2009.01)
*H04J 3/16* (2006.01)

(52) U.S. Cl.
USPC ............ 370/328; 370/331; 370/465; 455/436

(58) Field of Classification Search
None
See application file for complete search history.

(56) References Cited

U.S. PATENT DOCUMENTS

| | | | |
|---|---|---|---|
| 7,167,475 B2 * | 1/2007 | Tourunen et al. | 370/394 |
| 8,023,460 B2 * | 9/2011 | Motegi et al. | 370/329 |
| 2006/0256810 A1 | 11/2006 | Yarlagadda et al. | |
| 2009/0116399 A1 * | 5/2009 | Ho et al. | 370/252 |

FOREIGN PATENT DOCUMENTS

| | | |
|---|---|---|
| JP | 61-075648 A | 4/1986 |
| JP | 09-214512 A | 8/1997 |
| JP | 2005-318429 A | 11/2005 |
| JP | 2007-174120 A | 7/2007 |
| JP | 2007-180886 A | 7/2007 |
| JP | 2007-267017 A | 10/2007 |
| JP | 2007-274658 A | 10/2007 |
| WO | 01/60017 A1 | 8/2001 |
| WO | 03/105420 A1 | 12/2003 |
| WO | 2007/127558 A2 | 11/2007 |

OTHER PUBLICATIONS

Office Action for Japanese Patent Application No. 2009-547082 mailed May 24, 2011, with English translation thereof (6 pages).
3GPP TSG-RAN WG2 #59bis, LG Electronics Inc., R2-074242 "Discussion on RLC Discard", Shanghai, China, Oct. 8, 2007 (3 pages).

(Continued)

*Primary Examiner* — Faruk Hamza
*Assistant Examiner* — Cassandra Decker
(74) *Attorney, Agent, or Firm* — Osha Liang LLP

(57) ABSTRACT

A mobile station according to the present invention includes: a packet discarder unit (102, 103) configured to discard a packet in an uplink transmission buffer, after assigning a sequence number to the packet, when a predetermined condition is met.

5 Claims, 7 Drawing Sheets

OTHER PUBLICATIONS

3GPP TSG-RAN WG2 #60, Ericsson (Rapporteur), Tdoc R2-075237, "Report from Off-Line Discussions on SDU Discard Functionality", Jeju, Korea, Nov. 5, 2007 (2 pages).
Patent Abstract for Japanese Publication No. 09-214512 Published Aug. 15, 1997 (1 page).
Patent Abstract for Japanese Publication No. 61-075648 Published Apr. 18, 1986 (1 page).
Office Action in Japanese Patent Application No. 2009-547082 mailed Nov. 16, 2010, with English translation thereof (7 pages).
Patent Abstract, espacenet, in Publication No. 2003/105420 Publication date Dec. 18, 2003 (1 page).
3GPP TSG RAN WG1 #49bis, R1-073156 "Initial List of eNB Measurements", NTT DoCoMo, Orange, AT&T, T-Mobile, China Mobile, Telecom Italia, Telefonica, TeliaSonera, KPN, Vodafone, Orlando, U.S.A., Jun. 25, 2007 (12 pages).
Japanese Office Action for Application No. 2009-547082, mailed on Jan. 18, 2011 (6 pages).
3GPP TS 25.133 V10.1.0; 3rd Generation Partnership Project; Technical Specification Group Radio Access Network; Requirements for Support of radio resource management (FDD)(Release 10); 650 Route des Lucioles—Sophia Antipolis; Valbonne—France; Apr. 2011 (254 Pages).
International Search Report w/translation from PCT/JP2008/073220 dated Mar. 31, 2009 (4 pages).
Written Opinion from PCT/JP2008/073220 dated Mar. 31, 2009 (3 pages).
3GPP TR 25.814 v.7.0.0; "Physical layer aspects for evolved Universal Terrestrial Radio Access (UTRA)"; Jun. 2006 (126 pages).
3GPP TS 36.323 v8.0.0; "Packet Data Convergence Protocol (PDCP) Specification"; Dec. 2007 (26 pages).
Office Action for Chinese Patent Application No. 200880122181.8 issued Sep. 17, 2012, with English translation thereof (24 pages).
Extended European Search Report for European Application No. 08863557.8 dated Oct. 11, 2012 (10 pages).
L. Senthilkumar et al., "Teletraffic Engineering based Flow Admission Control for a DiffServ Network," IEEE Indicon 2005 Conference, Chennai, India, Dec. 2005 (5 pages).

\* cited by examiner

MOBILE STATION, RADIO BASE STATION, COMMUNICATION CONTROL METHOD, AND MOBILE COMMUNICATION SYSTEM

TECHNICAL FIELD

The present invention relates to a mobile station, a radio base station, a communication control method, and a mobile communication system. More specifically, the present invention relates to a mobile station, a radio base station, a communication control method, and a mobile communication system employing the LTE (Long Term Evolution) scheme.

BACKGROUND ART

A communication scheme succeeding the W-CDMA and the HSDPA, namely, the LTE is discussed by a standardization group 3GPP for the W-CDMA.

As radio access schemes for the LTE, OFDM (Orthogonal Frequency Division Multiplexing) and SC-FDMA (Single-Carrier Frequency Division Multiple Access) are discussed to be used for downlink and uplink, respectively.

The OFDM is a scheme where a certain frequency band is divided into a plurality of narrower frequency bands (subcarriers) and these frequency bands carry data for transmission. According to the OFDM, it is possible to achieve faster transmission and improve frequency utilization efficiency by arranging the subcarriers in the frequency band so densely that the subcarriers can partially overlap one another, without having mutual interference of the subcarriers.

Meanwhile, the SC-FDMA is a transmission scheme where a certain frequency band is divided and thus different frequency bands are used for transmission among multiple mobile stations, so that interference among the multiple mobile stations can be reduced. According to the SC-FDMA, it is possible to achieve low power consumption and wide coverage for the mobile stations since the SC-FDMA is characterized in that transmission power varies to a lesser extent.

Meanwhile, a mobile communication system is a system configured to perform communication by using limited radio resources (frequencies and power) and there is an upper limit on a communication capacity thereof.

Therefore, the number of mobile stations in a cell needs to be restricted in accordance with the above-mentioned communication capacity. For example, there is a case where, when a new mobile station attempts to start communication in the cell, the communication capacity is close to the upper limit because a large number of mobile stations are already performing communication in the cell. In this case, it is necessary to perform control that does not permit the new mobile station to start communication in the cell.

This control is generally referred to as call admission control, or "Call Admission Control (CAC)".

For example, one of conceivable methods of the call admission control is a method including measuring the number of the mobile stations already performing communication in the cell; giving no permission to the new mobile station to start communication in the cell when the number of the aforementioned mobile stations is more than a predetermined threshold; and giving a permission to the new mobile station to start communication in the cell when the number of the aforementioned mobile stations is equal to or below the predetermined threshold.

Although the above-mentioned example has described the case of using the number of the mobile stations already performing communication in the cell, it is preferable in light of the call admission control to judge whether or not to allow the new mobile station to start communication in the cell, based on an index that represents a degree of congestion in the cell.

Meanwhile, a mobile communication system generally includes multiple carriers. For example, here, assume that a certain mobile communication system has a frequency bandwidth of 20 MHz and the LTE having a system bandwidth of 5 MHz is operated within the frequency bandwidth of 20 MHz. In other words, four LTE carriers are assumed to exist.

In this case, it is preferable in light of effective utilization of frequency resources to equalize degrees of congestion among the four LTE carriers.

Here, one of services offered in the mobile communication system is a real-time service such as "Voice Over IP (VoIP)" or "Streaming".

In the real-time service, data must be transmitted from a communication source to a communication destination within a predetermined allowable delay due to the nature of the service.

In general, the data in the real-time service are transmitted preferentially over data in a best-effort service in order to satisfy the requirement concerning the delay.

However, in the case of an increase in the number of users performing communication of the real-time service in the cell, it is difficult to satisfy the above-described requirement on the delay for some of the users, because the radio resources in the cell are limited.

Moreover, in light of the call admission control, a phenomenon that there are users under the condition in which the requirement on the delay is not satisfied is used as an index for representing the degree of congestion.

To be more precise, it is conceivable to carry out the call admission control based on the number of users under the condition in which delay time of the real-time service data exceeds a predetermined allowable delay or on the number of the users under the condition in which the real-time service data are discarded in excess of the allowable delay.

However, the above-described conventional mobile communication system has the following problems.

In the mobile communication system of the LTE scheme, the call admission control is executed by a radio base station.

In this case, since a downlink transmission buffer exists in the radio base station, the radio base station can easily monitor discard of packets (data) of a real-time service due to buffered time of the packets in the transmission buffer exceeding the allowable delay.

On the other hand, an uplink transmission buffer exists in the mobile station. Accordingly, the radio base station cannot directly monitor the discard of packets of the real-time service due to the buffered time of the data in the transmission buffer exceeding the allowable delay.

Here, the mobile station is configured to transmit a signal called "Buffer Status Report" to the radio base station in order to notify a transmission buffer state in the mobile station. However, this signal is merely intended for notifying an amount of packets retained in the transmission buffer of the mobile station, and is not intended for notifying the discard of packets due to the buffered time that exceeds the allowable delay.

In the meantime, the mobile station transmits packets on a PDCP layer, while assigning sequence numbers to the packets. Accordingly, a method is also conceivable in which the radio base station estimates the discard of packets due to the buffered time in the transmission buffer of the mobile station exceeding the allowable delay, based on discontinuity of the sequence numbers of the packets on the PDCP layer.

However, an operation of discarding packets before or after the assignment of sequence numbers to the packets on the PDCP layer in the mobile station depends on implementation of the mobile station and is not defined.

To be more precise, the above-mentioned operation of the mobile station is not defined in the Non-patent Document 2 (TS36.323, V8.0.0) to define processing of the PDCP layer.

Therefore, it is difficult to estimate whether or not the packets are discarded in the transmission buffer of the mobile station, based on discontinuity of the sequence numbers.

Accordingly, the present invention has been made in view of the foregoing problems and an object thereof is to provide a mobile station, a radio base station, a communication control method, and a mobile communication system in which, when discarding a packet in a transmission buffer of the mobile station, the radio base station is capable of easily estimating discard of a packet in the transmission buffer of the mobile station, by always assigning a sequence number to the packet and then discarding the packet.

In addition, another object of the present invention is to provide a mobile station, a radio base station, a communication control method, and a mobile communication system which allow: selecting a frequency band to be used for communication or call admission control in a cell; and selecting a frequency band where the mobile station is to camp on after completion of the communication, on the basis of an event reported from the mobile station that the above-mentioned sequence numbers discontinues.

Moreover, still another object of the present invention is to provide a mobile station, a radio base station, a communication control method, and a mobile communication system which allow: monitoring buffered time (a delay amount) of data in an uplink transmission buffer; and reporting to the radio base station an event that the buffered time exceeds a predetermined threshold or an event that data in a transmission buffer of the mobile station are discarded due to excess of an allowable delay.

Further, yet another object of the present invention is to provide a mobile station, a radio base station, a communication control method, and a mobile communication system which allow: selecting the frequency band to be used for communication or call admission control in the cell; and selecting the frequency band where the mobile station is to camp on after completion of the communication, in which, on the basis of the event reported from the mobile station that the buffered time exceeds the predetermined threshold or the event reported from the mobile station that the data in the transmission buffer of the mobile station are discarded due to excess of the allowable delay.

A first aspect of the present invention is summarized as a mobile station configured to transmit and receive a packet provided with a sequence number to and from a radio base station, including: a packet discarder unit configured to discard a packet in an uplink transmission buffer, when a predetermined condition is met; wherein the packet discarder unit is configured to assign a sequence number to the discarded packet.

In the first aspect, the packet discarder unit can be configured to discard the packet, when buffered time of the packet in the transmission buffer exceeds a predetermined threshold.

In the first aspect, the packet discarder unit can be configured to discard the packet for each logical channel or for each logical channel group.

In the first aspect, the uplink transmission buffer can be a buffer for any of a PDCP layer and a RLC layer.

In the first aspect, the packet discarder unit can be configured to assign the sequence number to the discarded packet, by assigning sequence numbers to all packets stored in the transmission buffer.

In the first aspect, the uplink transmission buffer can be a buffer for any of a PDCP layer and a RLC layer; the packet discarder unit can be configured to assign the sequence number to the discarded packet, when a mode of the RLC layer is an unacknowledged mode; and the packet discarder unit can be configured not to assign the sequence number to the discarded packet, when the mode of the RLC layer is an acknowledged mode.

A second aspect of the present invention is summarized as a radio base station configured to transmit and receive a packet provided with a sequence number to and from a mobile station, including: a call admission controller unit configured to control admission of communication by a new mobile station, based on discontinuity of sequence numbers of packets received on an uplink.

A third aspect of the present invention is summarized as a radio base station configured to transmit and receive a packet provided with a sequence number to and from a mobile station, including: a discontinuity detector unit configured to detect discontinuity of sequence packets of a signal received on an uplink; a calculator unit configured to calculate any of the numbers of mobile stations and logical channels each incurring discontinuity of sequence numbers of the packets; and a call admission controller unit configured to control admission of communication by a new mobile station, based on any of the numbers of the mobile stations and the logical channels each incurring the discontinuity of the sequence numbers.

A fourth aspect of the present invention is summarized as a radio base station configured to transmit and receive a packet provided with a sequence number to and from a mobile station, including: a discontinuity detector unit configured to detect discontinuity of sequence numbers of packets received on an uplink; a calculator unit configured to calculate any of the numbers of mobile stations and logical channels each incurring discontinuity of sequence numbers of the packets; and a frequency band selector unit configured to select a frequency band to be used by a mobile station newly performing communication, based on any of the numbers of the mobile stations and the logical channels each incurring the discontinuity of the sequence numbers.

A fifth aspect of the present invention is summarized as a radio base station configured to transmit and receive a packet provided with a sequence number to and from a mobile station, including: a discontinuity detector unit configured to detect discontinuity of sequence numbers of packets received on an uplink; a calculator unit configured to calculate any of the numbers of mobile stations and logical channels each incurring discontinuity of sequence numbers of the packets; and a frequency band selector unit configured to select a frequency band in which a mobile station having completed communication is to camp on, based on any of the numbers of the mobile stations and the logical channels each incurring the discontinuity of the sequence numbers.

A sixth aspect of the present invention is summarized as a communication control method in a mobile station configured to transmit and receive a packet provided with a sequence number to and from a radio base station, including the step of: discarding a packet in an uplink transmission buffer, when a predetermined condition is met; wherein the discarded packet A seventh aspect of the present invention is summarized as a communication control method in a radio base station configured to transmit and receive a packet provided with a sequence number to and from a mobile station, including the steps of: detecting discontinuity of sequence numbers of packets received on an uplink; calculating any of the numbers of mobile stations and logical channels each incurring discontinuity of sequence numbers of the packets; and controlling admission of communication by a new mobile station, based on any of the numbers of the mobile stations and the logical channels.

An eighth aspect of the present invention is summarized as a mobile communication system including: a plurality of mobile stations; a radio base station configured to perform communication with the plurality of mobile stations by using a shared channel; a data server configured to save data transmitted from the radio base station; and a monitor terminal to which the data saved in the data server are outputted; wherein each of the plurality of mobile stations includes a packet discarder unit configured to assign a sequence number to a packet in an uplink transmission buffer and to discard the packet when a predetermined condition is met, the radio base station includes: a discontinuity detector unit configured to detect discontinuity of sequence numbers of packets received on an uplink from the plurality of mobile stations; a calculator unit configured to calculate any of the numbers of mobile stations and logical channels each incurring discontinuity of sequence numbers of the packets; and a reporter unit configured to report any of the numbers of the mobile stations and the logical channels to the data server; and the data server includes: a saver unit configured to save any of the numbers of the mobile stations and the logical channels as a statistical value; and an output unit configured to output any of the numbers of the mobile stations and the logical channels to the monitor terminal.

A ninth aspect of the present invention is summarized as a mobile station configured to perform communication with a radio base station, including: a data discarder unit configured to discard data in an uplink transmission buffer, when a predetermined condition is met; and a reporter unit configured to report discard of the data to the radio base station.

In the ninth aspect, the data discarder unit can be configured to discard the data, when buffered time of the data in the transmission buffer exceeds a predetermined threshold.

In the ninth aspect, the reporter unit can be configured to report the discard of the data by use of a measurement report for reporting a measurement result of communication quality on a downlink.

In the ninth aspect, the reporter unit can be configured to report the discard of the data, when any of the number of times of discard of the data and a discard proportion of the data exceeds a predetermined threshold.

In the ninth aspect, the reporter unit can be configured to report the discard of the data in response to an instruction from the radio base station.

In the ninth aspect, the data discarder unit can be configured to discard the data for each logical channel or each logical channel group; and the reporter unit can be configured to report the discard of the data for each logical channel or each logical channel group.

In the ninth aspect, the uplink transmission buffer can be a buffer for any of a PDCP layer and a RLC layer.

A tenth aspect of the present invention is summarized as a radio base station configured to perform communication with a mobile station, including: an instructor unit configured to instruct the mobile station to report discard of data in an uplink transmission buffer; and a receiver unit configured to receive a report of the discard of the data in the uplink transmission buffer from the mobile station.

An eleventh aspect of the present invention is summarized as a radio base station configured to perform communication with a plurality of mobile stations, including: an instructor unit configured to instruct the plurality of mobile stations to report discard of data in uplink transmission buffers; a receiver unit configured to receive reports of the discard of the data in the uplink transmission buffers from the plurality of mobile stations; a calculator unit configured to calculate any of the numbers of the mobile stations and logical channels each incurring the discard of the data; and a call admission controller unit configured to control admission of communication by a new mobile station, based on any of the numbers of the mobile stations and the logical channels.

A twelfth aspect of the present invention is summarized as a radio base station configured to perform communication with a plurality of mobile stations, including: an instructor unit configured to instruct the plurality of mobile stations to report discard of data in uplink transmission buffers; a receiver unit configured to receive reports of the discard of the data in the uplink transmission buffers from the plurality of mobile stations; a calculator unit configured to calculate any of the numbers of the mobile stations and logical channels each incurring the discard of the data; and a frequency band selector unit configured to select a frequency band to be used by a mobile station newly performing communication, based on any of the numbers of the mobile stations and the logical channels.

A thirteenth aspect of the present invention is summarized as a radio base station configured to perform communication with a plurality of mobile stations, including: an instructor unit configured to instruct the plurality of mobile stations to report discard of data in uplink transmission buffers; a receiver unit configured to receive reports of the discard of the data in the uplink transmission buffers from the plurality of mobile stations; a calculator unit configured to calculate any of the numbers of the mobile stations and logical channels each incurring the discard of the data; and a frequency band selector unit configured to select a frequency band in which a mobile station having completed communication is to camp on, based on any of the numbers of the mobile stations and the logical channels.

A fourteenth aspect of the present invention is summarized as a communication control method in a mobile station configured to perform communication with a radio base station, including the steps of: discarding data in an uplink transmission buffer when a predetermined condition is met; and reporting discard of the data to the radio base station.

A fifteenth aspect of the present invention is summarized as a communication control method in a radio base station configured to perform communication with a plurality of mobile stations, including the steps of: instructing the plurality of mobile stations to report discard of data in uplink transmission buffers; receiving reports of the discard of the data in the uplink transmission buffers from the plurality of mobile stations; calculating any of the numbers of the mobile stations and logical channels each incurring the discard of the data; and controlling admission of communication by a new mobile station, based on any of the numbers of the mobile stations and the logical channels.

A sixteenth aspect of the present invention is summarized as a mobile communication system including: a plurality of mobile stations; a radio base station configured to perform communication with the plurality of mobile stations by using a shared channel; a data server configured to save data transmitted from the radio base station; and a monitor terminal to which the data saved in the data server are outputted; wherein each of the plurality of mobile stations includes: a data discarder unit configured to discard data in a uplink transmission buffer, when a predetermined condition is met; and a reporter unit configured to report discard of the data to the radio base station, the radio base station includes: a receiver unit configured to receive reports of the discard of the data in the uplink transmission buffers from the plurality of mobile stations; a calculator unit configured to calculate any of the numbers of the mobile stations and logical channels each incurring the discard of the data; and a reporter unit configured to report any of the numbers of the mobile stations and the logical channels to the data server; and the data server includes: a saver unit configured to save any of the numbers of the mobile stations and the logical channels as a statistical value; and an output unit configured to output any of the numbers of the mobile stations and the logical channels to the monitor terminal.

A seventeenth aspect of the present invention is summarized as a mobile station configured to perform communication with a radio base station, including: a calculator unit configured to calculate average time from generation to transmission of data in an uplink transmission buffer; and a reporter unit configured to report that the average time exceeds a predetermined threshold, or to report the average time to the radio base station when the average time exceeds the predetermined threshold.

BEST MODES FOR CARRYING OUT THE INVENTION (Configuration of Mobile Communication System According to First Embodiment of Present Invention)

A configuration of a mobile communication system according to a first embodiment of the present invention will be described with reference to FIG. 1 to FIG. 3.

A mobile communication system 1000 according to this embodiment is a mobile communication system employing the LTE, for example, and includes multiple mobile stations $100_1$ to $100_n$, a radio base station 200 configured to perform communication with the multiple mobile stations $100_1$ to $100_n$ by using a shared channel, an access gateway device (an upper station) 300 connected to the radio base station 200 and to a core network 400, a data server 410 configured to save data transmitted from the radio base station 200, and a monitor terminal 420 to which the data saved in the data server 410 are outputted.

Figure 1:
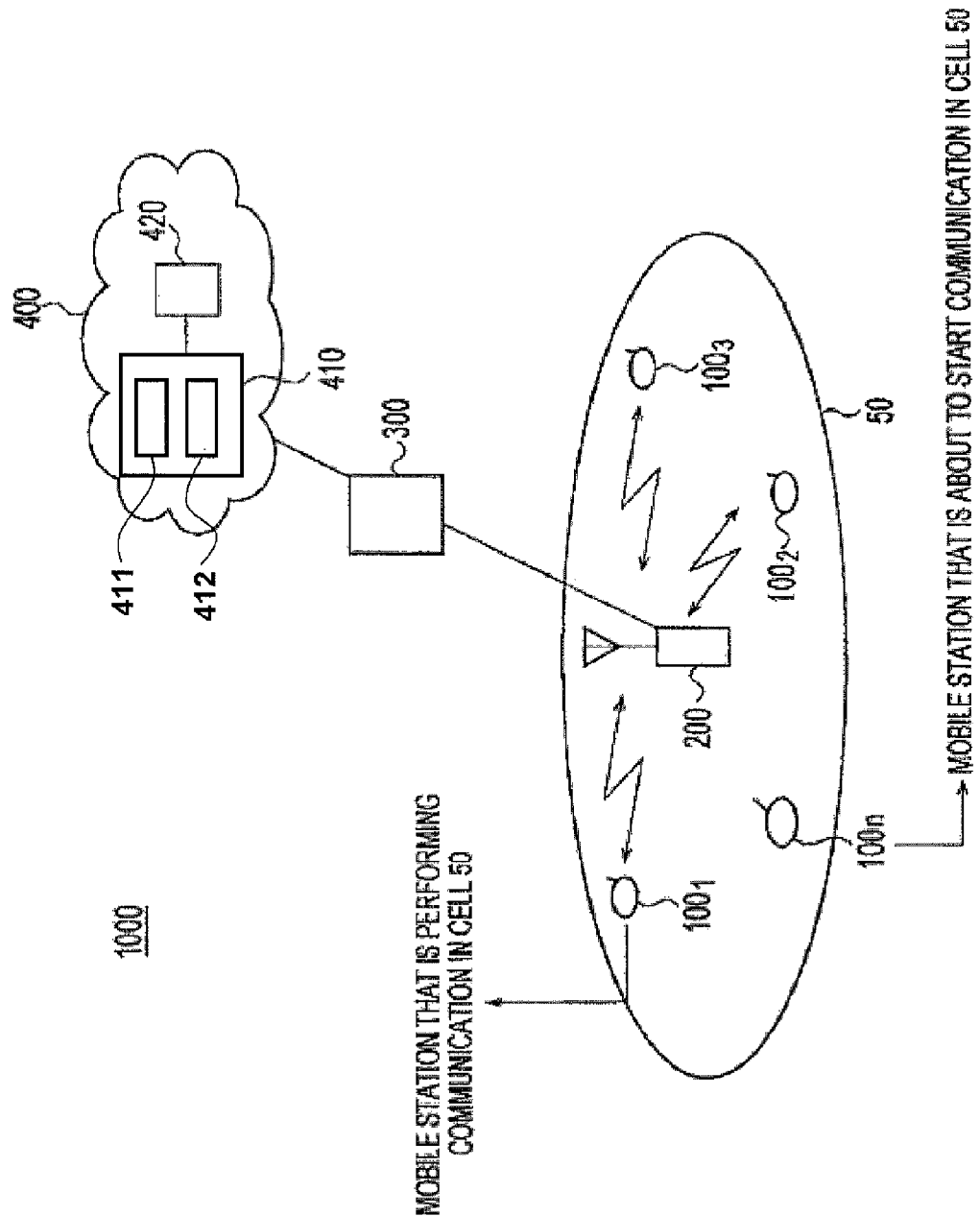
FIG. 1 is an overall configuration diagram of a mobile communication system according to a first embodiment of the present invention.

In the example of FIG. 1, the mobile stations $100_1$ to $100_3$ are the mobile stations that are communicating in a cell 50, while the mobile station $100_n$ is the mobile station which is about to start communication in the cell 50.

Here, the multiple mobile stations $100_1$ to $100_n$ are configured to communicate with the radio base station 200 in accordance with the LTE in the cell 50.

Specifically, since connection is established between the mobile stations $100_1$ to $100_3$ and the radio base station 200, the mobile stations $100_1$ to $100_3$ are in an active state.

In the following, the mobile stations $100_1$, $100_2$, $100_3$, ... $100_n$ have configurations, functions, and states which are identical to one another and will be hereinafter referred to as the mobile stations 100 unless otherwise noted.

In the example of FIG. 1, there is just one mobile station in the cell 50 in the state of an attempt to newly start communication with the radio base station 200. However, there may be two or more mobile stations in such a state.

As for radio access schemes, the mobile communication system 1000 is configured to employ the OFDM (frequency division multiple access) to downlink and to employ SC-FDMA (single-carrier frequency division multiple access) to uplink.

Now, communication channels in the LTE will be described.

Concerning the downlink, a physical downlink shared channel (PDSCH) to be shared by the mobile stations 100 and a downlink control channel for the LTE are used.

On the downlink, information on a user to be mapped on the physical downlink shared channel and information on a transport format, information on a user to be mapped on a physical uplink shared channel and information on a transport format, information on transmission acknowledgment of the physical uplink shared channel, and so forth is notified by use of the downlink control channel for the LTE, while user data are transmitted by use of the physical downlink shared channel.

Note that the information on transmission acknowledgment of the physical uplink shared channel may be transmitted by use of a physical HARQ indicator channel (PHICH: Physical Hybrid Indicator Channel) instead of the downlink control channel for the LTE.

Meanwhile, the above-described downlink control channel for the LTE may also be referred to as a physical downlink control channel (PDCCH). To be more precise, the information on the user to be mapped on the physical downlink shared channel and the information on the transport format as described above may also be referred to as downlink scheduling information.

In contrast, the information on the user to be mapped on the physical uplink shared channel and the information on the transport format as described above may also be referred to as uplink scheduling grant.

Here, the downlink scheduling information and the uplink scheduling grant may also be collectively referred to as downlink control information (DCI).

In this case, DCI format 0 may correspond to the uplink scheduling grant while DCI format 1/1A/2 or the like may correspond to the downlink scheduling information.

Concerning the uplink, a physical uplink shared channel (PUSCH) to be shared by the mobile stations 100 and an uplink control channel for the LTE are used.

Here, the uplink control channel is a physical uplink control channel (PUCCH) on two ends of a system bandwidth, and a control signal as indicated below is transmitted by use of the physical uplink shared channel.

Specifically, on the uplink, downlink quality information (CQI: Channel Quality Indicator) to be used for scheduling and an adaptive modulation and coding scheme (AMCS) for the physical downlink shared channel, and information on transmission acknowledgment of the physical downlink shared channel (HARQ ACK information) are transmitted by use of the uplink control channel for the LTE.

Here, when the physical uplink shared channel and the control signal are transmitted at the same timing, i.e. in the same subframe, the control signal is multiplexed with the physical uplink shared channel and transmitted.

Meanwhile, the user data are transmitted by use of the physical uplink shared channel.

Figure 2:
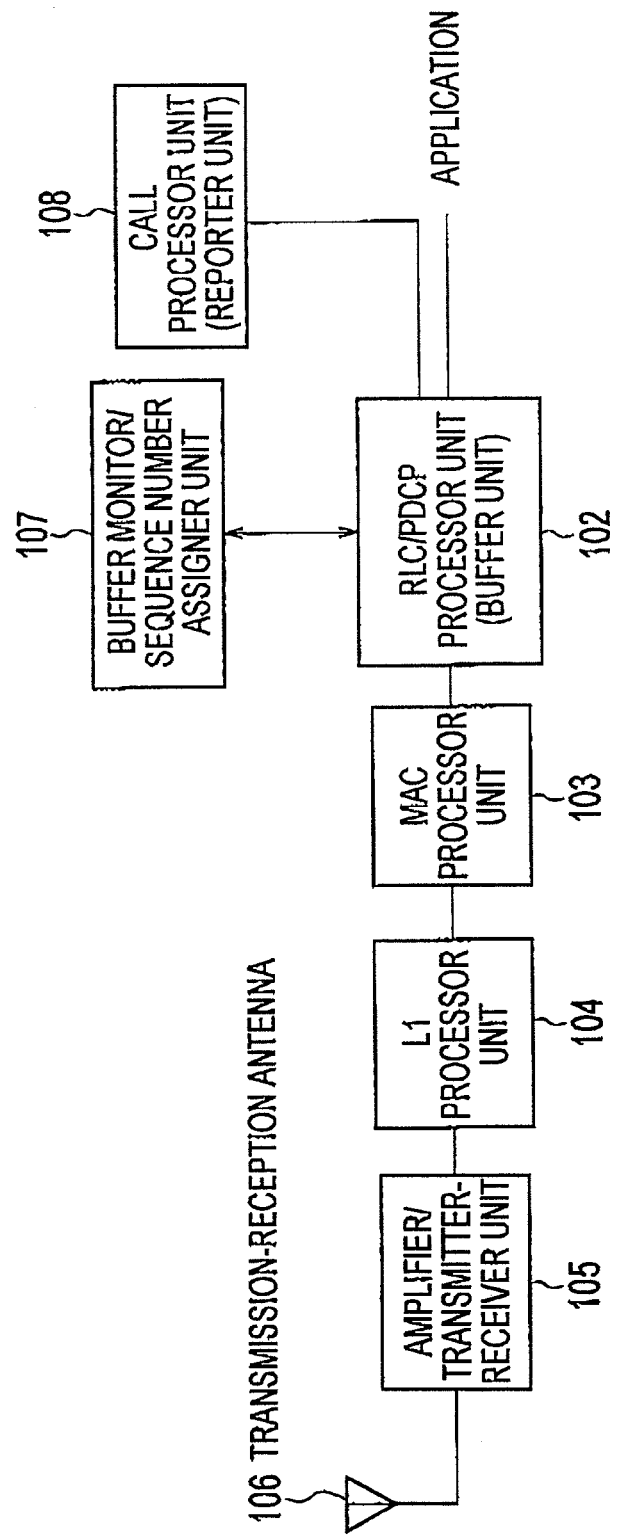
FIG. 2 is a functional block diagram of a mobile station according to the first embodiment of the present invention.

As shown in FIG. 2, the mobile station 100 includes a RLC/PDCP processor unit 102, a MAC processor unit 103, an L1 processor unit 104, an amplifier/transmitter-receiver unit 105, a transmission-reception antenna 106, a buffer monitor/sequence number assigner unit 107, and a call processor unit 108.

The RLC/PDCP processor unit 102 is configured to perform RLC (Radio Link Control) layer processing and PDCP (Packet Data Convergence Protocol) processing.

For example, the RLC/PDCP processor unit 102 is configured to perform transmission processing by use of segmentation, concatenation, and RLC retransmission control on the uplink, and to perform reception processing by use of segmentation, concatenation, and RLC retransmission control on the downlink, and the like as the RLC layer processing.

Moreover, the RLC/PDCP processor unit 102 is configured to assign a sequence number (SN) to a packet to be transmitted on the uplink, and to perform ciphering processing by using the sequence number as the PDCP processing.

The packet subjected to the RLC or PDCP layer processing undergoes transmission processing as data to be transmitted on the uplink (uplink data) by the MAC processor unit 103 described below.

The MAC processor unit 103 is configured to perform MAC (Media Access Control) layer processing.

For example, the MAC processor unit 103 is configured to perform transmission processing and the like by use of MAC retransmission control (such as HARQ: Hybrid Automatic Repeat reQuest) on the uplink data as the MAC layer processing.

Moreover, the MAC processor unit 103 is configured to perform reception processing by use of the MAC retransmission control on the downlink data as the MAC layer processing.

The L1 processor unit 104 is configured to perform layer 1 processing including channel coding, DFT processing, and IFFT processing of the data transmitted via the uplink, as well as channel decoding and FFT processing of the data received via the downlink, and so forth.

The amplifier/transmitter-receiver unit 105 is configured to convert a baseband signal outputted from the L1 processor unit 104 into a radio frequency band signal, and then to amplify the radio frequency band signal and to transmit the radio frequency band signal via the transmission-reception antenna 106.

Moreover, the amplifier/transmitter-receiver unit 105 is configured to amplify the radio frequency band signal received by the transmission-reception antenna 106, and then to convert the radio frequency band signal into the baseband signal and to input the baseband signal to the L1 processor unit 104.

The buffer monitor/sequence number assigner unit 107 is configured to monitor an uplink transmission buffer (a MAC layer buffer in the MAC processor unit 103 or any of a RLC layer buffer and a PDCP layer buffer in the RLC/PDCP processor unit 102).

Here, the buffer monitor/sequence number assigner unit 107 is configured to discard a packet in the uplink transmission buffer when a predetermined condition is met.

For example, the buffer monitor/sequence number assigner unit 107 is configured to discard a packet, when buffered time of the packet in the uplink transmission buffer exceeds a predetermined threshold. To be more precise, the above-described buffered time in the transmission buffer means time elapsed after the packet is generated and stored in the transmission buffer.

Here, the buffer monitor/sequence number assigner unit 107 is configured to assign the sequence number to the above-described packet, which is supposed to be discarded, and then to discard the packet. The sequence number is a sequence number of the PDCP layer, for example.

Here, the buffer monitor/sequence number assigner unit 107 may be configured to assign the sequence number to the packet immediately before discarding the packet, or alternatively, may be configured to retain the packet in the state provided with the sequence number in the transmission buffer and to discard the packet when the above-mentioned predetermined condition is met.

In the former case, the buffer monitor/sequence number assigner unit 107 may be configured to assign the sequence number to the packet almost simultaneously with the processing to discard the packet, for example.

On the other hand, in the latter case, the buffer monitor/sequence number assigner unit 107 may be configured to assign the sequence number to the packet at a point when the packet is stored in the transmission buffer, for example.

Specifically, the buffer monitor/sequence number assigner 107 unit may be configured to assign the sequence numbers to all the packets to be stored in the transmission buffer.

Meanwhile, the above-described example shows the case where the buffer monitor/sequence number assigner 107 unit discards the packet when the buffered time of the packet in the uplink transmission buffer exceeds the predetermined threshold. However, the buffer monitor/sequence number assigner unit 107 may also perform similar processing in a case of discarding the packet in the uplink transmission buffer other than the aforementioned situation.

Here, the "case of discarding the packet in the uplink transmission buffer other than the aforementioned situation" may be a case of discarding the packet due to a buffer overflow or a case of discarding the packet due to "Active Queue Management (AQM)", for example.

Here, the AQM is a control method for reducing a window size of a TCP layer by discarding the packet in the transmission buffer in order to prevent a sudden increase in the packets in the transmission buffer.

Specifically, the window size of the TCP layer is reduced when the packets in transmission buffer are discarded. As a consequence, it is possible to reduce an amount of the packets flowing into the transmission buffer and to prevent the above-mentioned problem of the sudden increase in the packets in the transmission buffer.

Meanwhile, the buffer monitor/sequence number assigner unit 107 may be configured to discard the packet in the uplink transmission buffer for each logical channel (or for each logical channel group). In this case as well, the buffer monitor/sequence number assigner unit 107 is configured to assign the sequence number to the packet, which is supposed to be discarded, and then to discard the packet.

Here, the logical channel group may be designated by the radio base station 200. Meanwhile, the logical channel or the logical channel group may be set up for each communication service such as the VoIP service.

Alternatively, the buffer monitor/sequence number assigner unit 107 may be configured to perform the above-described processing, namely, the processing to assign the sequence number to the packet and then to discard the packet, depending on whether a mode of the RLC layer is an "unacknowledged mode (UM)", an "acknowledged mode (AM)" or a "transparent mode (TM)".

To be more precise, the buffer monitor/sequence number assigner unit 107 may be configured to perform the above-described processing, if the mode of the RLC layer is either the "UM" or the "TM", and not to perform the above-described processing, if the mode of the RLC layer is the "AM".

Alternatively, the buffer monitor/sequence number assigner unit 107 may be configured to perform the above-described processing, if the mode of the RLC layer is the "UM", and not to perform the above-described processing, if the mode of the RLC layer is either the "AM" or the "TM".

As described above, when the packet to be discarded in the transmission buffer of the mobile station is provided with the sequence number of the PDCP layer and then the packet is discarded, the radio base station 200 located on a receiving side of the packets can easily estimate whether or not a packet is discarded in the transmission buffer of the mobile station, based on the discontinuity of the sequence numbers of the PDCP layer of the received packets.

The call processor unit 108 is configured to perform call processing and the like including setup and release of the communication channel.

Here, the RLC/PDCP processor unit 102, the buffer monitor/sequence number assigner unit 107, and the call processor unit 108 may be configured to be mounted on the same IC chip. Or the RLC/PDCP processor unit 102, the MAC processor unit 103, the L1 processor unit 104, the buffer monitor/sequence number assigner unit 107, and the call processor unit 108 may be configured to be mounted on the same IC chip.

Figure 3:
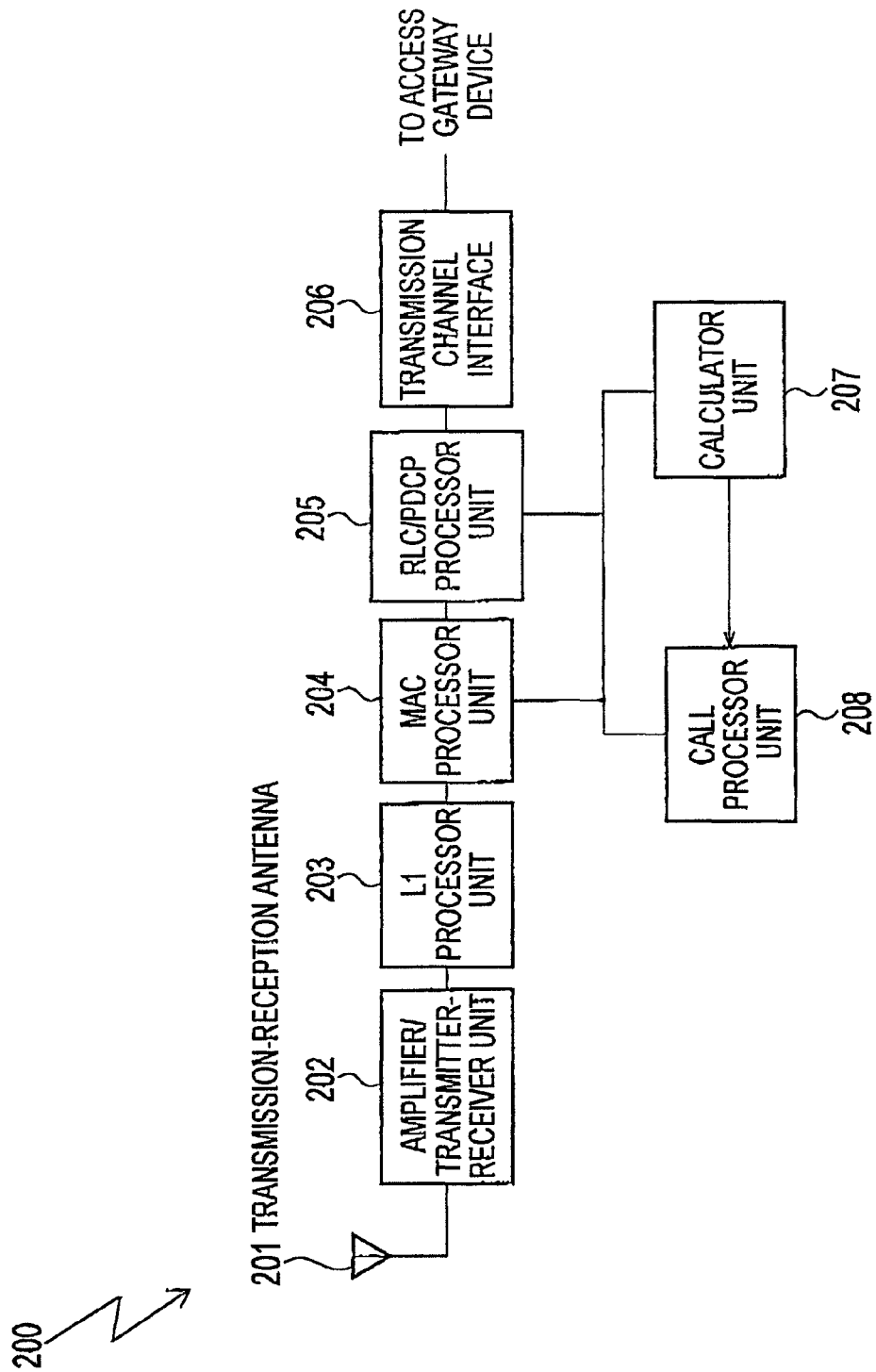
FIG. 3 is a functional block diagram of a radio base station according to the first embodiment of the present invention.

As shown in FIG. 3, the radio base station 200 includes a transmission-reception antenna 201, an amplifier/transmitter-receiver unit 202, an L1 processor unit 203, a MAC processor unit 204, a RLC/PDCP processor unit 205, a transmission channel interface 206, a calculator unit 207, and a call processor unit 208.

The amplifier/transmitter-receiver unit 202 is configured to convert a baseband signal outputted from the L1 processor unit 203 into a radio frequency band signal, and then to amplify the radio frequency band signal and to transmit the radio frequency band signal via the transmission-reception antenna 201.

Moreover, the amplifier/transmitter-receiver unit 202 is configured to amplify the radio frequency band signal received by the transmission-reception antenna 201, and then to convert the radio frequency band signal into the baseband signal and to input the baseband signal to the L1 processor unit 203.

The L1 processor unit 203 is configured to perform the layer 1 processing including channel coding and IFFT processing of the data transmitted via the downlink, as well as FFT processing, IDFT processing, and channel decoding of the data received via the uplink, and so forth.

The MAC processor unit 204 is configured to perform MAC layer processing. For example, the MAC processor unit 204 is configured to perform the transmission processing by use of the MAC retransmission control (such as the HARQ: Hybrid Automatic Repeat reQuest) on the downlink data, scheduling, selection of a transmission format, and the like as the MAC layer processing.

Moreover, the MAC processor unit 204 is configured to perform reception processing by use of the MAC retransmission control on the uplink data, scheduling, selection of the transmission format, and the like as the MAC layer processing.

The RLC/PDCP processor unit 205 is configured to perform the RLC layer processing and the PDCP processing.

For example, the RLC/PDCP processor unit 205 is configured to perform transmission processing by use of segmentation, concatenation, and RLC retransmission control on the downlink, and to perform reception processing by use of segmentation, concatenation, and RLC retransmission control on the uplink, and the like as the RLC layer processing.

Moreover, the RLC/PDCP processor unit 205 is configured to perform deciphering of the packets to be received on the uplink as the PDCP layer processing. At this time, the RLC/PDCP processor unit 205 is able to acquire the sequence numbers of the packets along with deciphering and thereby to detect discontinuity of the sequence numbers. These sequence numbers are the sequence numbers of the PDCP layer.

Upon occurrence of discontinuity of the sequence numbers, the RLC/PDCP processor unit 205 is configured to notify the calculator unit 207 of an event representing occurrence of discontinuity of the sequence. Here, the RLC/PDCP processor unit 205 may be configured to notify the event representing the occurrence of discontinuity of the sequence numbers for each of the multiple mobile stations $100_1$ to $100_n$ or the logical channels thereof.

The transmission channel interface 206 is configured to perform data transmission and reception with an access gateway device 300.

The calculator unit 207 is configured to receive the event representing the occurrence of discontinuity of the sequence numbers of the PDCP layer from the RLC/PDCP processor unit 205. Here, the event representing the occurrence of discontinuity of the sequence numbers may be notified for each of the multiple mobile stations $100_1$ to $100_n$ or the logical channels thereof.

Moreover, the calculator unit 207 is configured to calculate the number of the mobile stations or the logical channels which incurred the discontinuity of the sequence numbers.

The calculator unit 207 is configured to notify the call processor unit 208 of the number of the mobile stations or the logical channels which incurred the discontinuity of the sequence numbers.

To be more precise, the calculator unit 207 may be configured to determine the number of the mobile stations, which have the number of the discontinuity of the sequence numbers equal to or above a predetermined threshold within a predetermined monitoring period, as the number of the mobile stations which incurred the discontinuity of the sequence numbers.

Alternatively, the calculator unit 207 may be configured to determine the number of the mobile stations, in which an amount of the discarded packets estimated from the discontinuity of the sequence numbers is equal to or above a predetermined threshold within a predetermined monitoring period, as the number of the mobile stations which incurred the discontinuity of the sequence numbers.

Alternatively, the calculator unit 207 may be configured to determine the number of the mobile stations, in which a proportion of the amount of the discarded packets estimated from the discontinuity of the sequence numbers relative to a total amount of the received packets is equal to or above a predetermined threshold within a predetermined monitoring period, as the number of the mobile stations which incurred the discontinuity of the sequence numbers.

Meanwhile, the calculator unit 207 may be configured to calculate the number of the mobile stations which incurred the discontinuity of the sequence numbers for each logical channel. In this case, calculation of the number of the above-described mobile stations is performed on the logical channels. Specifically, the calculator unit 207 is configured to calculate the number of the logical channels which incurred the discontinuity of the sequence numbers.

Note that the number of the mobile stations or the logical channels which incurred the discontinuity of the sequence numbers of the PDCP layer may be regarded as the number of the mobile stations or the logical channels which incurred the discard of the packets in the transmission buffers in the mobile stations. In this case, the calculator unit 207 may be configured to calculate the number of the mobile stations or the logical channels which incurred the discard of the packets in the transmission buffers in the mobile stations.

In the above-described example, the number of the mobile stations or the logical channels which incurred the discard of the packets in the transmission buffers in the mobile stations is calculated by: the RLC/PDCP processor unit 205 detecting the discontinuity of the sequence numbers of the PDCP layer; and the calculator unit 207 calculating the number of the mobile stations or the logical channels which incurred the discontinuity of the sequence numbers of the PDCP layer. Instead, the number of the mobile stations or the logical channels which incurred the discard of the packets in the transmission buffers in the mobile stations may be calculated by: the RLC/PDCP processor unit 205 detecting discontinuity of sequence numbers of a RTP (Real-time Transport Protocol); and the calculator unit 207 calculating the number of the mobile stations or the logical channels which incurred the discontinuity of the sequence numbers of the RTP.

Alternatively, when it is possible to presume the discard of the packets in the transmission buffers in the mobile stations by use of the discontinuity of the sequence numbers, the number of the mobile stations or the logical channels which incurred the discard of the packets in the transmission buffers in the mobile stations may be calculated based on discontinuity of sequence numbers of a protocol other than the PDCP or the RTP.

The call processor unit 208 is configured to perform call processing including setup and release of the communication channel, status management of the radio base station 200, management of radio resources, and so forth.

To be more precise, the call processor unit 208 may be configured to control admission of communication by a new mobile station, based on the number of the mobile stations or the logical channels which incurred the discard of the packets calculated by the calculator 207.

For example, the call processor unit 208 may be configured to reject admission of communication by a new mobile station, when the number of the mobile stations or the logical channels which incurred the discontinuity of the sequence numbers of the PDCP layer exceeds the predetermined threshold in a specific cell.

In the above-described example, the call processor unit 208 is configured to reject admission of communication by the new mobile station, based on the number of the mobile stations or the logical channels which incurred the discontinuity of the sequence numbers of the PDCP layer. Instead, the call processor unit 208 may be configured to reject admission of communication by the new mobile station, based on a proportion of the mobile stations or the logical channels which incurred the discontinuity of the sequence numbers of the PDCP layer.

In this case, the above-mentioned proportion of the mobile stations may be a proportion relative to the number of RRC_Connected mobile stations (the number of LTE_ACTIVE mobile stations).

Meanwhile, the above-mentioned proportion of the logical channels may be a proportion relative to an aggregate number of the logical channels set up in the cell 50.

For example, if the above-mentioned predetermined threshold is set to 10% while there are 100 mobile stations set up with the logical channels for transmitting the VoIP, then the call processor unit 208 may be configured to reject admission of communication by the new mobile station, when the number of the logical channels which incurred the discontinuity of the sequence numbers of the PDCP layer exceeds 10.

Meanwhile, the call processor unit 208 may be configured to select a frequency band to be used by the mobile station that newly performs the communication, based on the number of the mobile stations or the logical channels which incurred the discontinuity of the sequence numbers of the PDCP layer calculated by the calculator unit 207.

In the above-described example, the call processor unit 208 is configured to select the frequency band to be used by the mobile station that newly performs the communication, based on the number of the mobile stations or the logical channels which incurred the discontinuity of the sequence numbers of the PDCP layer. Instead, the call processor unit 208 may be configured to select the frequency band to be used by the mobile station that newly performs the communication, based on a proportion of the mobile stations or the logical channels which incurred the discontinuity of the sequence numbers of the PDCP layer.

In this case, the above-mentioned proportion of the mobile stations may be the proportion relative to the number of the RRC_Connected mobile stations (the number of the LTE_ACTIVE mobile stations). Meanwhile, the above-mentioned proportion of the logical channels may be the proportion relative to the aggregate number of the logical channels set up in the cell 50.

For example, the call processor unit 208 may be configured to select a frequency band having the smallest number of the mobile stations or the logical channels which incurred the discontinuity of the sequence numbers of the PDCP layer, as the frequency band to be used by the mobile station that newly performs the communication.

Meanwhile, the call processor unit 208 may be configured to select a frequency band in which a mobile station that completed the communication is supposed to camp on, based on the number of the mobile stations or the logical channels which incurred the discontinuity of the sequence numbers of the PDCP layer calculated by the calculator unit 207.

In the above-described example, the call processor unit 208 is configured to select the frequency band in which the mobile station that completed the communication is supposed to camp on, based on the number of the mobile stations or the logical channels which incurred the discontinuity of the sequence numbers of the PDCP layer. Instead, the call processor unit 208 may be configured to select the frequency band in which the mobile station that completed the communication is supposed to camp on, based on a proportion of the mobile stations or the logical channels which incurred the discontinuity of the sequence numbers of the PDCP layer.

In this case, the above-mentioned proportion of the mobile stations may be the proportion relative to the number of the RRC_Connected mobile stations (the number of the LTE- _ACTIVE mobile stations). Meanwhile, the above-mentioned proportion of the logical channels may be the proportion relative to the aggregate number of the logical channels set up in the cell 50.

For example, the call processor unit 208 may be configured to select the frequency band having the smallest number of the mobile stations or the logical channels which incurred the discontinuity of the sequence numbers of the PDCP layer, as the frequency band in which the mobile station that completed the communication is supposed to camp on.

Here, the call processor unit 208 may be configured to report the number of the mobile stations or the logical channels which incurred the discontinuity of the sequence numbers of the PDCP layer calculated by the calculator unit 207, to the data server 410 via the transmission channel interface 206.

The data server 410 according to this embodiment is configured to save the number of the mobile stations or the logical channels described above, via the saver unit 411, which is transmitted from the radio base station 200, as a statistical value.

Moreover, the data server 410 is configured to output the number of the mobile stations or the logical channels described above via the output unit 412, to the monitor terminal 420.

As a result, an operator can monitor the degree of congestion in the cell by monitoring the number of the mobile stations or the logical channels described above which is outputted to the monitor terminal 420.

Meanwhile, if the operator judges that the cell exceeds a capacity as a consequence of monitoring the degree of the congestion in the cell, because the degree of congestion in the cell is constantly high or because the degree of congestion in the cell reaches a maximum in a day, then the operator can determine enhancement of equipment by increasing the number of carriers in the cell, increasing the number of cells, expanding a bandwidth of the carrier in the cell, and so forth.
(Operations of Mobile Communication System According to First Embodiment of Present Invention)

An operation of the mobile station 100 according to the first embodiment of the present invention will be described with reference to FIG. 4.

Figure 4:
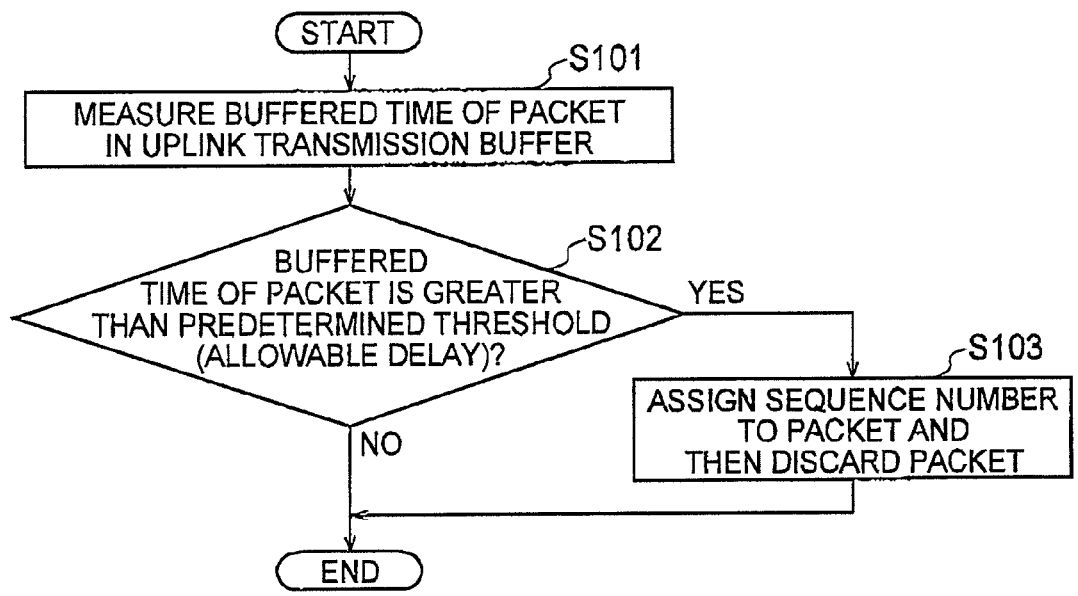
FIG. 4 is a flowchart showing an operation of the mobile station according to the first embodiment of the present invention.

As shown in FIG. 4, in step S101, the mobile station 100 measures the buffered time of the packet in the uplink transmission buffer for each logical channel (or for each logical channel group). The packet may be a packet of the PDCP layer or a packet of the RLC layer, for example.

In step S102, the mobile station 100 judges for each logical channel (or for each logical channel group) as to whether or not the buffered time of the packet is greater than a predetermined threshold (an allowable delay).

The operation goes to step S103 when the buffered time of the packet is judged to be greater than the predetermined threshold. The operation is terminated when the buffered time of the packet is judged not to be greater than the predetermined threshold.

In step S103, the mobile station 100 assigns the sequence number of the PDCP layer to the packet and then discards the packet.

Here, the mobile station 100 may assign the sequence number to the packet immediately before discarding, or alternatively, may retain the packet in the state provided with the sequence number in the transmission buffer and discard the packet based on the judgment in step S102. In the former case, assignment of the sequence number is executed in the processing in step S103. On the other hand, in the latter case, assignment of the sequence number may be executed before the processing in step S103, for example.

To be more precise, the mobile station 100 may be configured to assign the sequence numbers to all the packets stored in the transmission buffer and thereby to assign the sequence number to the discarded packet as well.

Next, an operation of the radio base station 200 according to this embodiment will be described with reference to FIG. 5.

Figure 5:
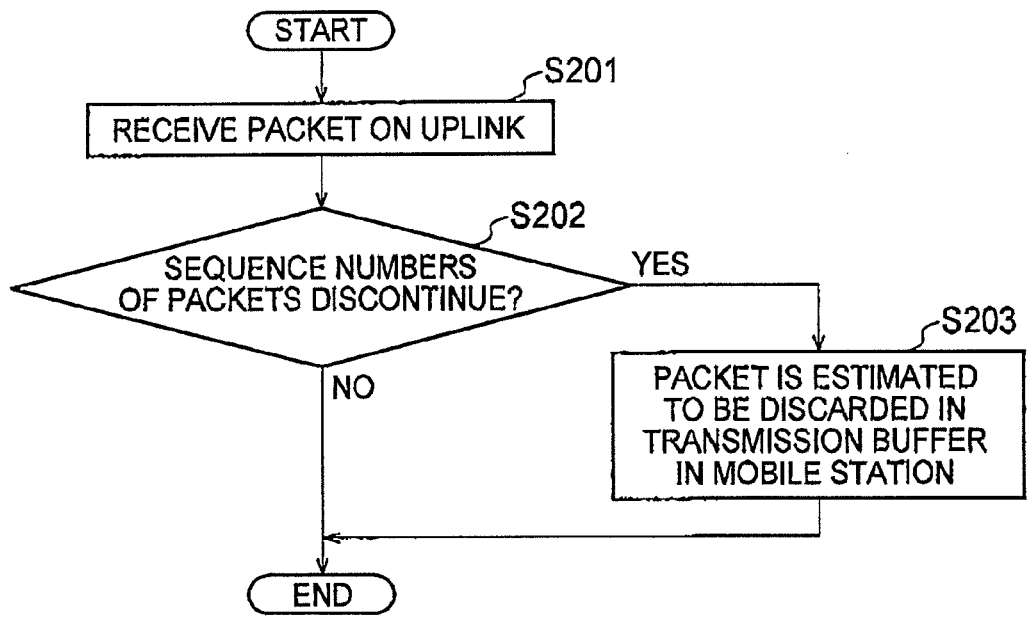
FIG. 5 is a flowchart showing an operation of the radio base station according to the first embodiment of the present invention.

As shown in FIG. 5, the base station 200 receives a packet on the uplink in step S201.

In step S202, the radio base station 200 judges whether or not the sequence number of the packet is discontinuous.

The operation goes to step S203 when the sequence number of the packet is judged to be discontinuous. The operation is terminated when the sequence number of the packet is judged not to be discontinuous.

In step S203, the radio base station 200 estimates that the packet is discarded in the transmission buffer in the mobile station.
(Operation and Effect of Mobile Communication System According to First Embodiment of Present Invention)

According to the mobile communication system of this embodiment, the mobile station 100 assigns the sequence number to the packet and then discards the packet when discarding the packet in the transmission buffer of the mobile station due to excess of the allowable delay, and the radio base station 200 monitors the discontinuity of the sequence number. Hence it is possible to easily detect the discard of the packet in the transmission buffer of the mobile station due to the excess of the allowable delay.

Moreover, according to the mobile communication system of this embodiment, it is possible to select the frequency band to be used for the call admission control in the cell and for the communication or to select the frequency band for the mobile station to camp on therein after completion of the communication, based on the event that the discontinuity of the uplink sequence numbers occurs, i.e., the event that the packet in the transmission buffer of the mobile station is discarded due to the excess of the allowable delay.
(Mobile Communication System According to Second Embodiment of Present Invention)

Now, a mobile communication system according to a second embodiment of the present invention will be described below with reference to FIG. 6 to FIG. 8. In the following, the mobile communication system according to this embodiment will be explained while focusing on differences from the mobile communication system according to the above-described first embodiment.

Figure 6:
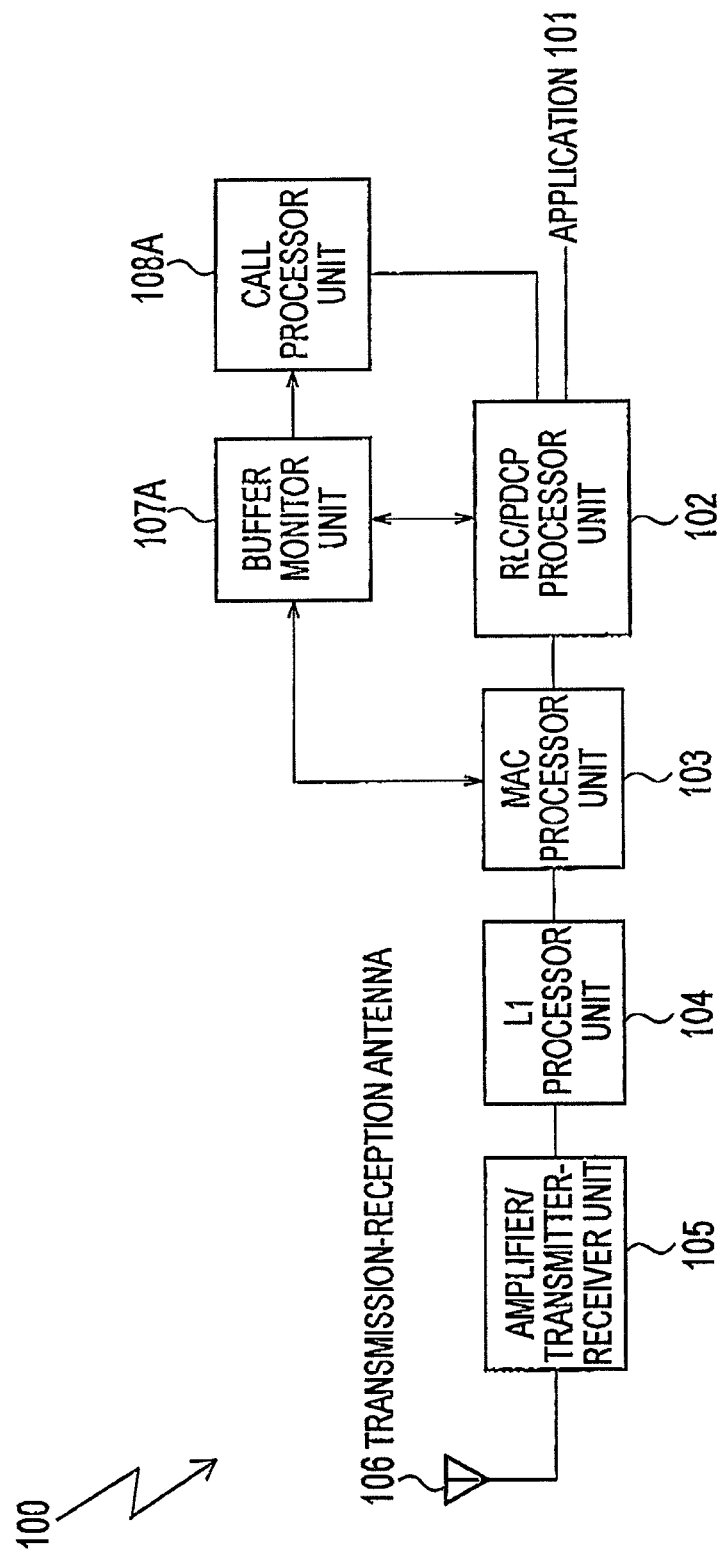
FIG. 6 is a functional block diagram of a mobile station according to a second embodiment of the present invention.

As shown in FIG. 6, a mobile station 100 includes the RLC/PDCP processor unit 102, the MAC processor unit 103, the L1 processor unit 104, the amplifier/transmitter-receiver unit 105, the transmission-reception antenna 106, a buffer monitor unit 107A, and a call processor unit 108A.

The buffer monitor unit 107A is configured to monitor the uplink transmission buffer (the MAC layer buffer in the MAC processor unit 103 or any of the RLC layer buffer and the PDCP layer buffer in the RLC/PDCP processor unit 102).

Here, the buffer monitor unit 107A is configured to discard data in the uplink transmission buffer when a predetermined condition is met.

For example, the buffer monitor unit 107A is configured to discard data, when buffered time of the data in the uplink transmission buffer exceeds a predetermined threshold. To be more precise, the above-described buffered time in the transmission buffer means time elapsed after the data are generated and stored in the transmission buffer.

Meanwhile, the buffer monitor unit 107A may be configured to discard the data in the uplink transmission buffer for each the logical channel (or for each logical channel group).

Here, the logical channel group may be designated by the radio base station 200. Meanwhile, the logical channel or the logical channel group may be set up for each communication service such as the VoIP service.

Moreover, the buffer monitor unit 107A is configured to calculate average time from generation to transmission of the data in the uplink transmission buffer.

Here, the buffer monitor unit 107A may be configured to calculate the above-described average time for each logical channel (or for each logical channel group).

Note that the above-described average time may be calculated as a value obtained by averaging, for all of the packets, time from generation to transmission of the data in the uplink transmission buffer for each one packet of the above-described data.

Here, the one packet of the above-mentioned data may represent RLC SDU, a PDCP data unit, a RTP packet or a TCP packet, for example. Note that the above-described data may generally be formed of one packet or two or more packets.

Meanwhile, the above-mentioned term "from generation to transmission of the data" may be defined as "from a point when the data to be transmitted on the uplink are generated to a point when the data are transmitted and transmission acknowledgment information (ACK) concerning the data is received".

Note that the above-mentioned transmission acknowledgment information (ACK) may be any of transmission acknowledgment information on the MAC layer, transmission acknowledgment information on the RLC layer, and transmission acknowledgment information on the PDCP layer.

Meanwhile, the above-mentioned event "to be transmitted" may be defined as an event that "the data are deleted from the transmission buffer", and deletion of the data due to completion of a maximum retransmission number of the HARQ, deletion of the data at the time of hand over, and deletion of the data due to the buffered time in the buffer exceeding the predetermined threshold may be included in the above-mentioned event "to be transmitted".

The call processor unit 108A is configured to perform call processing including setup and release of the communication channel, and so forth.

Here, the call processor unit 108A is configured to report the discard of the data in the uplink transmission buffer to the radio base station 200.

For example, the call processor unit 108A may be configured to report the discard of the data in the uplink transmission buffer by use of a measurement report for reporting a result of measurement of downlink communication quality.

Meanwhile, when the above-mentioned average time exceeds a predetermined threshold, the call processor unit 108A is configured to report that the above-mentioned average time exceeds the predetermined threshold or to report the average time by use of the measurement report.

Here, the call processor unit 108A may be configured to transmit the measurement report in accordance with an "Event Triggered" scheme or a "Periodic" scheme defined in the 3GPP TS25.133.

Here, the "Event Triggered" scheme is the scheme to transmit the measurement report upon occurrence of a specific event, while the "Periodic" scheme is the scheme to transmit the measurement report periodically.

Meanwhile, the call processor unit 108A may be configured to transmit the measurement report in accordance with a "Time to Trigger" scheme or a "Pending Time After Trigger" scheme.

Here, the "Time to Trigger" scheme is the scheme to transmit the measurement report only when a specific event continues for a lapse of a predetermined time period from occurrence of the specific event.

Meanwhile, the "Pending Time After Trigger" scheme is the scheme to stop transmission of the measurement report for a predetermined period once when the measurement report is transmitted.

Here, the measurement report may be a RRC message or any of header information and control information (Control Message) of the MAC layer. The above-mentioned control information of the MAC layer may also be called as MAC Control Element.

Here, the measurement report may include the above-described average time, an amount of discarded data, the number of times of discard of the data, a proportion of discard of the data, and the like.

Meanwhile, the call processor unit 108A may be configured to report the discard of the data when the number of times of discard of the data or the proportion of discard of the data in the uplink transmission buffer exceeds a predetermined threshold.

Meanwhile, the call processor unit 108A may be configured to report the discard of the data in the uplink transmission buffer in response to an instruction from the radio base station 200.

The call processor unit 108A may be configured to report that the above-mentioned average time exceeds the predetermined threshold or to report the average time in response to an instruction from the radio base station 200.

Here, the above-mentioned instruction from the radio base station 200 may be notified in the form of a control signal of the RRC layer such as Measurement Control, may be notified in the form of information in a System Information Block of broadcast information, or may be notified in the form of a control signal of the MAC layer.

Meanwhile, the call processor unit 108A may be configured to report the discard of the data in the uplink transmission buffer for each logical channel (or for each logical channel group).

The call processor unit 108A may be configured to report that the above-mentioned average time exceeds the predetermined threshold, or to report the average time for each logical channel (or for each logical channel group).

When the measurement report is transmitted in accordance with the above-described "Periodic" scheme, the call processor unit 108A may be configured to periodically report the discard of the data in the uplink transmission buffer or that the above-mentioned average time exceeds the predetermined threshold.

Here, the RLC/PDCP processor unit 102, the buffer monitor unit 107A, and the call processor unit 108A may be configured to be mounted on the same IC chip. Or the RLC/PDCP processor unit 102, the MAC processor unit 103, the L1 processor unit 104, the buffer monitor unit 107A, and the call processor unit 108A may be configured to be mounted on the same IC chip.

In the radio base station 200 according to this embodiment, the calculator unit 207 is configured to receive the measurement report, which is the report of the discard of the data in the uplink transmission buffer, from the multiple mobile stations $100_1$ to $100_n$.

When the measurement report is transmitted in accordance with the above-described "Periodic" scheme, the calculator unit 207 may be configured to periodically receive a report that the data in the uplink transmission buffer is discarded or that the above-mentioned average time exceeds the predetermined threshold.

Here, if the measurement report is the RRC message, the calculator unit 207 is configured to receive the measurement report via the RLC/PDCP processor unit 205. If the measurement report is either the header information or the control information of the MAC layer, the calculator unit 207 is configured to receive the measurement report via the MAC processor unit 204.

Moreover, the calculator unit 207 is configured to calculate the number of the mobile stations or the logical channels in which the data are discarded.

Alternatively, the calculator unit 207 is configured to receive the measurement report, which is the report that the average time from generation to transmission of the data in the uplink transmission buffer exceeds the predetermined threshold, from the multiple mobile stations $100_1$ to $100_n$.

Here, if the measurement report is the RRC message, the calculator unit 207 is configured to receive the measurement report via the RLC/PDCP processor unit 205. If the measurement report is either the header information or the control information of the MAC layer, the calculator unit 207 is configured to receive the measurement report via the MAC processor unit 204.

Moreover, the calculator unit 207 is configured to calculate the number of the mobile stations or the logical channels in which the above-described average time exceeds the predetermined threshold.

Meanwhile, in the radio base station 200 according to this embodiment, the call processor unit 208 is configured to perform the call processing including setup and release of the communication channel, the status management of the radio base station 200, the management of the radio resources, and so forth.

To be more precise, the call processor unit 208 may be configured to control admission of communication by a new mobile station, based on the number of the mobile stations or the logical channels which incurred the discard of the data calculated by the calculator unit 207.

For example, the call processor unit 208 may be configured to reject admission of communication by the new mobile station, when the number of the mobile stations or the logical channels which incurred the discard of the data exceeds the predetermined threshold in a specific cell.

In the above-described example, the call processor unit 208 is configured to reject admission of communication by the new mobile station, based on the number of the mobile stations or the logical channels which incurred the discard of the data. Instead, the call processor unit 208 may be configured to reject admission of communication by the new mobile station, based on a proportion of the mobile stations or the logical channels which incurred the discard of the data.

In this case, the above-mentioned proportion of the mobile stations may be the proportion relative to the number of the RRC_Connected mobile stations (the number of the LTE_ACTIVE mobile stations).

Meanwhile, the above-mentioned proportion of the logical channels may be the proportion relative to the aggregate number of the logical channels set up in the cell 50.

For example, if the above-mentioned predetermined threshold is set to 10% while there are 100 mobile stations set up with the logical channels for transmitting the VoIP, then the call processor unit 208 may be configured to reject admission of communication by the new mobile station when the number of the logical channels which incurred the discard of the data exceeds 10.

Meanwhile, the call processor unit 208 may be configured to control admission of communication by the new mobile station, based on the number of the mobile stations or the logical channels in which the above-described average time exceeds the predetermined threshold calculated by the calculator unit 207.

For example, the call processor unit 208 may be configured to reject admission of communication by the new mobile station, when the number of the mobile stations or the logical channels, in which the above-described average time exceeds the predetermined threshold in a specific cell.

In the above-described example, the call processor unit 208 is configured to reject admission of communication by the new mobile station, based on the number of the mobile stations or the logical channels in which the above-described average time exceeds the predetermined threshold. Instead, the call processor unit 208 may be configured to reject admission of communication by the new mobile station, based on the proportion of the mobile stations or the logical channels in which the above-described average time exceeds the predetermined threshold.

In this case, the above-mentioned proportion of the mobile stations may be the proportion relative to the number of the RRC_Connected mobile stations (the number of the LTE_ACTIVE mobile stations).

Meanwhile, the above-mentioned proportion of the logical channels may be the proportion relative to the aggregate number of the logical channels set up in the cell 50.

For example, if the above-mentioned predetermined threshold is set to 10% while there are 100 mobile stations set up with the logical channels for transmitting the VoIP, then the call processor unit 208 may be configured to reject admission of communication by the new mobile station, when the number of the logical channels, in which the above-described average time exceeds the predetermined threshold, exceeds 10.

Meanwhile, the call processor unit 208 may be configured to select the frequency band to be used by the mobile station that newly performs the communication, based on the number of the mobile stations or the logical channels which incurred the discard of the data calculated by the calculator unit 207.

In the above-described example, the call processor unit 208 is configured to select the frequency band to be used by the mobile station that newly performs the communication, based on the number of the mobile stations or the logical channels which incurred the discard of the data. Instead, the call processor unit 208 may be configured to select the frequency band to be used by the mobile station that newly performs the communication, based on the proportion of the mobile stations or the logical channels which incurred the discard of the data.

In this case, the above-mentioned proportion of the mobile stations may be the proportion relative to the number of the RRC_Connected mobile stations (the number of the LTE_ACTIVE mobile stations). Meanwhile, the above-mentioned proportion of the logical channels may be the proportion relative to the aggregate number of the logical channels set up in the cell 50.

For example, the call processor unit 208 may be configured to select the frequency band having the smallest number of the mobile stations or the logical channels which incurred the discard of the data, as the frequency band to be used by the mobile station that newly performs the communication.

Meanwhile, the call processor unit 208 may be configured to select the frequency band to be used by the mobile station that newly performs the communication, based on the number of the mobile stations or the logical channels in which the above-described average time exceeds the predetermined threshold calculated by the calculator unit 207.

In the above-described example, the call processor unit 208 is configured to select the frequency band to be used by the mobile station that newly performs the communication, based on the number of the mobile stations or the logical channels in which the above-described average time exceeds the predetermined threshold. Instead, the call processor unit 208 may be configured to select the frequency band to be used by the mobile station that newly performs the communication, based on the proportion of the mobile stations or the logical channels in which the above-described average time exceeds the predetermined threshold.

In this case, the above-mentioned proportion of the mobile stations may be the proportion relative to the number of the RRC_Connected mobile stations (the number of the LTE_ACTIVE mobile stations). Meanwhile, the above-mentioned proportion of the logical channels may be the proportion relative to the aggregate number of the logical channels set up in the cell 50.

For example, the call processor unit 208 may be configured to select the frequency band having the smallest number of the mobile stations or the logical channels in which the above-described average time exceeds the predetermined threshold, as the frequency band to be used by the mobile station that newly performs the communication.

Meanwhile, the call processor unit 208 may be configured to select the frequency band in which the mobile station that completed the communication is supposed to camp on, based on the number of the mobile stations or the logical channels which incurred the discard of the data calculated by the calculator unit 207.

In the above-described example, the call processor unit 208 is configured to select the frequency band in which the mobile station that completed the communication is supposed to camp on, based on the number of the mobile stations or the logical channels which incurred the discard of the data. Instead, the call processor unit 208 may be configured to select the frequency band in which the mobile station that completed the communication is supposed to camp on, based on a proportion of the mobile stations or the logical channels which incurred the discard of the data.

In this case, the above-mentioned proportion of the mobile stations may be the proportion relative to the number of the RRC_Connected mobile stations (the number of the LTE_ACTIVE mobile stations). Meanwhile, the above-mentioned proportion of the logical channels may be the proportion relative to the aggregate number of the logical channels set up in the cell 50.

For example, the call processor unit 208 may be configured to select the frequency band having the smallest number of the mobile stations or the logical channels which incurred the discard of the data, as the frequency band in which the mobile station that completed the communication is supposed to camp on.

Meanwhile, the call processor unit 208 may be configured to select the frequency band in which the mobile station that completed the communication is supposed to camp on, based on the number of the mobile stations or the logical channels in which the above-described average time exceeds the predetermined threshold calculated by the calculator unit 207.

In the above-described example, the call processor unit 208 is configured to select the frequency band in which the mobile station that completed the communication is supposed to camp on, based on the number of the mobile stations or the logical channels in which the above-described average time exceeds the predetermined threshold. Instead, the call processor unit 208 may be configured to select the frequency band in which the mobile station that completed the communication is supposed to camp on, based on the proportion of the mobile stations or the logical channels in which the above-described average time exceeds the predetermined threshold.

In this case, the above-mentioned proportion of the mobile stations may be the proportion relative to the number of the RRC_Connected mobile stations (the number of the LTE_ACTIVE mobile stations). Meanwhile, the above-mentioned proportion of the logical channels may be the proportion relative to the aggregate number of the logical channels set up in the cell 50.

For example, the call processor unit 208 may be configured to select the frequency band having the smallest number of the mobile stations or the logical channels in which the above-described average time exceeds the predetermined threshold, as the frequency band in which the mobile station that completed the communication is supposed to camp on.

Here, the call processor unit 208 may be configured to report the number of the mobile stations or the logical channels which incurred the discard of the data, or the number of the mobile stations or the logical channels in which the above-described average time exceeds the predetermined threshold, each of which being calculated by the calculator unit 207, to the data server 410 via the transmission channel interface 206.

Meanwhile, the call processor unit 208 may instruct the multiple mobile stations $100_1$ to $100_n$ to report the discard of the data in the uplink transmission buffers.

Alternatively, the call processor unit 208 may instruct the multiple mobile stations $100_1$ to $100_n$ to report that the average time from generation to transmission of the data in the uplink transmission buffer exceeds the predetermined threshold or to report the average time.

Here, the above-mentioned instruction from the call processor unit 208 in the radio base station 200 to the multiple mobile stations $100_1$ to $100_n$ may be notified in the form of the control signal of the RRC layer such as Measurement Control, may be notified in the form of the information in the System Information Block of the broadcast information, or may be notified in the form of the control signal of the MAC layer.

The data server 410 according to this embodiment is configured to save the number of the mobile stations or the logical channels described above, which is transmitted from the radio base station 200, as the statistical value.

Moreover, the data server 410 is configured to output the number of the mobile stations or the logical channels described above to the monitor terminal 420.

As a result, the operator can monitor the degree of congestion in the cell by monitoring the number of the mobile stations or the logical channels described above which is outputted to the monitor terminal 420.

Meanwhile, if the operator judges that the cell exceeds the capacity as a consequence of monitoring the degree of the congestion in the cell, because the degree of congestion in the cell is constantly high or because the degree of congestion in the cell reaches the maximum in a day, then the operator can determine enhancement of equipment by increasing the number of carriers in the cell, increasing the number of cells, expanding the bandwidth of the carrier in the cell, and so forth.

Operations of the mobile station 100 according to the second embodiment of the present invention will be described with reference to FIG. 7 and FIG. 8.

First, a first operation of the mobile station 100 according to this embodiment will be described with reference to FIG. 7.

Figure 7:
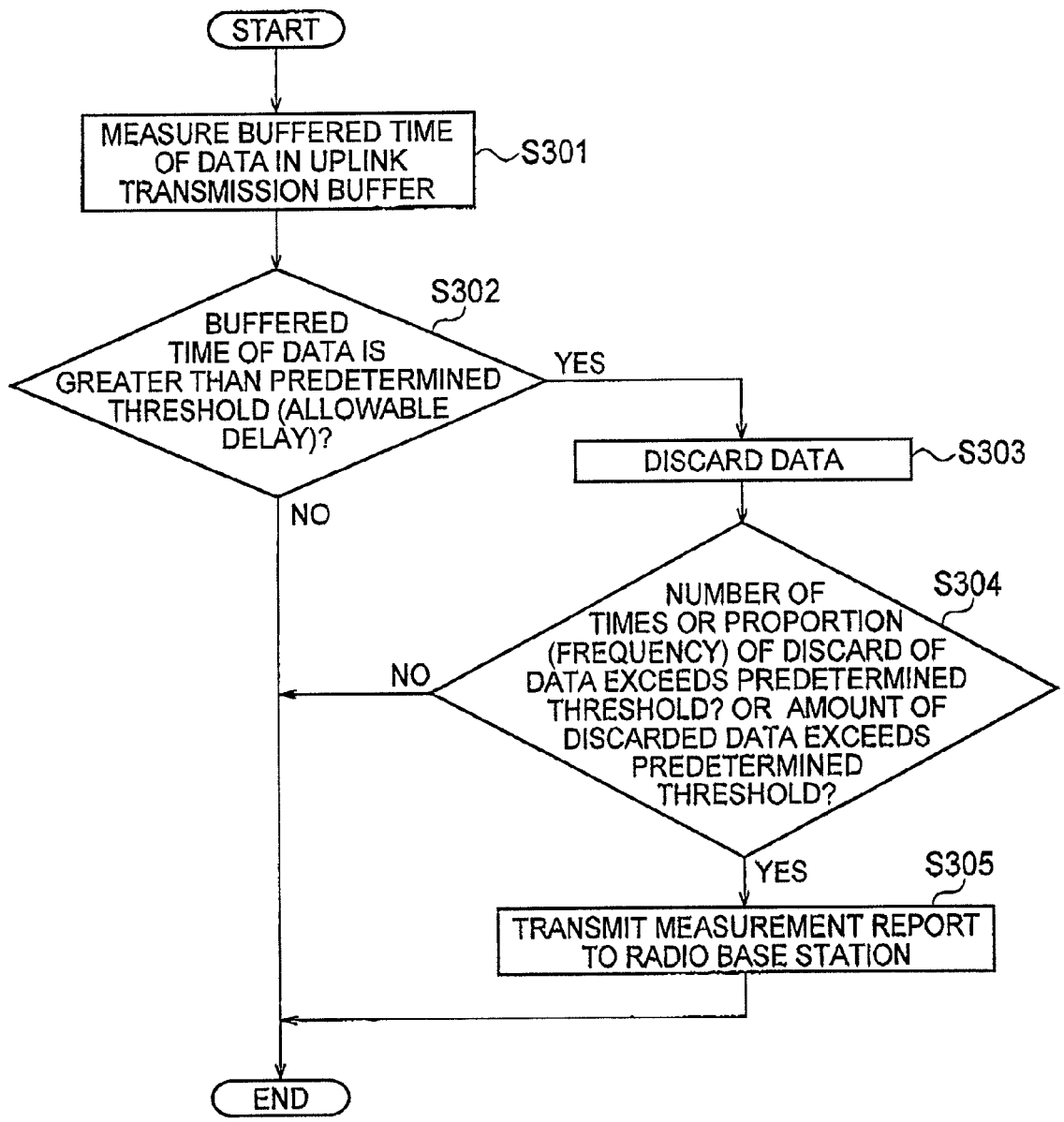
FIG. 7 is a flowchart showing an operation of the mobile station according to the second embodiment of the present invention.

As shown in FIG. 7, in step S301, the mobile station 100 measures the buffered time of the data in the uplink transmission buffer for each logical channel (or for each logical channel group).

In step S302, the mobile station 100 judges for each logical channel (or for each logical channel group) as to whether or not the buffered time of the data is greater than the predetermined threshold (the allowable delay).

The operation goes to step S303 when the buffered time of the data is judged to be greater than the predetermined threshold. The operation is terminated when the buffered time of the data is judged not to be greater than the predetermined threshold.

In step S303, the mobile station 100 discards the data.

In step S304, the mobile station 100 judges whether or not the number of times of discard of the data or the discard proportion (a discard frequency) of the data exceeds a predetermined threshold, or alternatively, whether or not the amount of the discarded data exceeds a predetermined threshold.

The operation goes to step S305 when either the number of times of discard of the data or the discard proportion of the data is judged to exceed the predetermined threshold (or when the amount of the discarded data is judged to exceed the predetermined threshold). The operation is terminated when either the number of times of discard of the data or the discard proportion of the data is judged not to exceed the predetermined threshold (or when the amount of the discarded data is judged not to exceed the predetermined threshold).

In step S305, the mobile station 100 reports that the number of times of discard of the data or the discard proportion of the data exceeds the predetermined threshold (or that the amount of the discarded data exceeds the predetermined threshold) to the radio base station 200 by using the measurement report.

Here, the mobile station 100 may report a combination of any of the number of times of discard of the data, the discard proportion of the data, and the amount of the discarded data by use of the measurement report.

Second, a second operation of the mobile station 100 according to this embodiment will be described with reference to FIG. 8.

Figure 8:
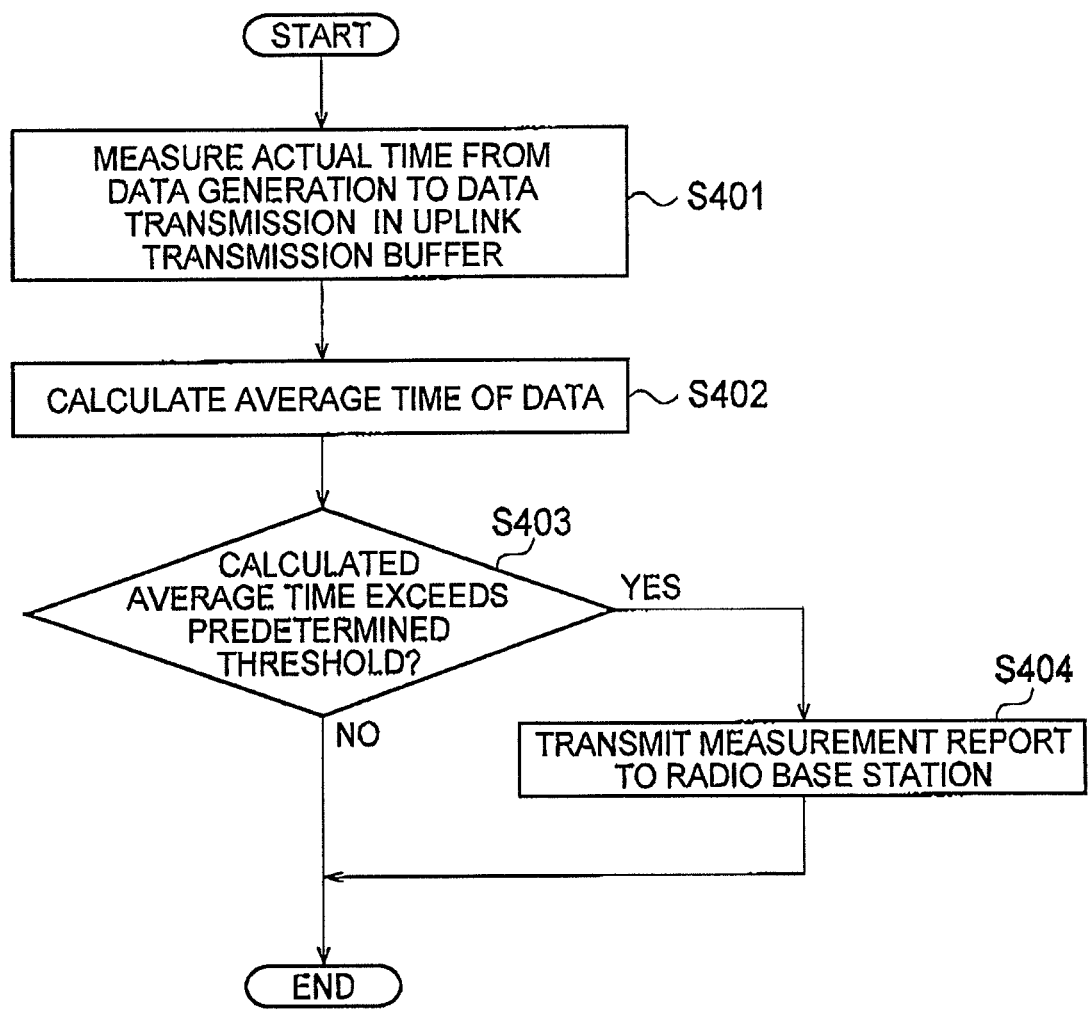
FIG. 8 is a flowchart showing an operation of the mobile station according to the second embodiment of the present invention.

As shown in FIG. 8, the mobile station 100 measures an actual time period from input to the transmission buffer to transmission concerning each data in the uplink transmission buffer in step S401, and obtains an average of the above-described time periods (the average time) concerning the data for each logical channel (or for each logical channel group) in step S402.

In step S403, the mobile station 100 judges whether or not the calculated average time exceeds the predetermined threshold.

The operation goes to step S404 when the average time is judged to exceed the predetermined threshold. The operation is terminated when the average time is judged not to exceed the predetermined threshold.

In step S404, the mobile station 100 reports that the average time exceeds the predetermined threshold to the radio base station 200 by using the measurement report.

Here, the mobile station 100 may also report the averaged time periods by use of the measurement report as well.

Meanwhile, when the measurement report is transmitted in accordance with the above-described "Periodic" scheme, it is also possible to periodically report that the average time exceeds the predetermined threshold or to periodically report the averaged time periods.

According to the mobile communication system of this embodiment, the mobile station 100 is capable of: monitoring the buffered time (a delay amount) of the data in the uplink transmission buffer; and reporting the event that the buffered time exceeds the predetermined threshold or the event that the data in the transmission buffer of the mobile station are discarded due to excess of the allowable delay, to the radio base station 200.

Moreover, according to the mobile communication system of this embodiment, it is capable of: selecting the frequency band to be used for the call admission control in the cell and for the communication; and selecting the frequency band for the mobile station to camp on therein after completion of the communication, based on the event that the buffered time exceeds the predetermined threshold or the event that the data in the transmission buffer of the mobile station are discarded due to excess of the allowable delay, which is reported from the mobile station 100.

Note that the above-described operations of the mobile station 100 and a radio base station 200 may be implemented by hardware, implemented by a software module to be executed by a processor, or implemented in a combination of both.

Here, the software module may be a protocol stack which is hierarchized by a layer structure, for example. Meanwhile, the processor may be formed into hardware as a chip set and configured to execute the protocol stack, for example.

Meanwhile, the software module may be provided in a storage medium of an arbitrary format such as a RAM (Random Access Memory), a flash memory, a ROM (Read Only Memory) an EPROM (Erasable Programmable ROM), an EEPROM (Electronically Erasable and Programmable ROM), a register, a hard disk, a removable disk or a CD-ROM.

Such a storage medium is connected to the processor so as to allow the processor to read and write information from and to the storage medium. Meanwhile, the storage medium may be integrated with the processor. In addition, the storage medium or the processor may be provided in an ASIC. Such an ASIC may be provided in a mobile station 100 and a radio base station 200. Moreover, the storage medium and the processor may be provided in the mobile station 100 and the radio base station 200 as discrete components.

Although the present invention has been described in detail by use of the aforementioned embodiments, it is obvious to those skilled in the art that the present invention will not be limited to the embodiments described in this specification. The present invention can be implemented as changed and modified embodiments without departing from the gist and scope of the present invention to be defined by the description of the appended claims. It is therefore to be understood that the description in this specification is provided to explain the examples and not intended in any way to limit the scope of the invention.

Industrial Applicability

As described above, according to the present invention, it is possible to provide a mobile station, a radio base station, a communication control method, and a mobile communication system, which enable the radio base station to easily estimate an event that a packet in a transmission buffer of the mobile is discarded due to excess of an allowable delay.

Moreover, according to the present invention, it is possible to provide the mobile station, the radio base station, the communication control method, and the mobile communication system, which are capable of: selecting a frequency band to be used for call admission control in a cell or communication; and selecting a frequency band for the mobile station to camp on therein after completion of the communication, based on an event that discontinuity of sequence numbers occurs in uplink signals.

Moreover, according to the present invention, it is possible to provide the mobile station, the radio base station, the communication control method, and the mobile communication system, which are capable of: monitoring buffered time (a delay amount) of data in an uplink transmission buffer; and reporting an event that the buffered time exceeds a predetermined threshold or an event that data in a transmission buffer of the mobile station are discarded due to excess of an allowable delay, to the radio base station.

In addition, according to the present invention, it is possible to provide the mobile station, the radio base station, the communication control method, and the mobile communication system, which are capable of: selecting the frequency band to be used for the call admission control in the cell or the communication; and selecting the frequency band for the mobile station to camp on therein after completion of the communication, based on the event that the buffered time exceeds the predetermined threshold or the event that the data in the transmission buffer of the mobile station are discarded due to excess of the allowable delay.

The invention claimed is:

1. A mobile station configured to transmit and receive packets, each provided with a sequence number, on a Packet Data Convergence Protocol (PDCP) layer to and from a radio base station, comprising:
    a buffer monitor/sequence number assigner configured to discard a packet on the PDCP layer in a transmission buffer of the PDCP layer, when a buffered time of the packet on the PDCP layer in the transmission buffer exceeds a predetermined threshold; wherein
    the buffer monitor/sequence number assigner is configured to assign a sequence number to the discarded packet on the PDCP layer, when a mode of an Radio Link Control (RLC) layer is an unacknowledged mode; and
    the buffer monitor/sequence number assigner is configured not to assign a sequence number to the discarded packet on the PDCP layer, when the mode of the RLC layer is an acknowledged mode.

2. A radio base station configured to transmit and receive packets, each provided with a sequence number, on a Packet Data Convergence Protocol (PDCP) layer to and from a mobile station, comprising:
    a RLC/PDCP (Radio Link Control/Packet Data Convergence Protocol) processor configured to detect discontinuity of sequence numbers of packets on the PDCP layer received on an uplink; and
    a calculator unit configured to calculate, for each logical channel, a proportion of discarded packets on the PDCP layer to all packets on the PDCP layer.

3. The radio base station according to claim 2, further comprising:
    a call admission controller unit configured to control admission of communication by a new mobile station, based on the proportion.

4. A communication control method in a radio base station configured to transmit and receive packets, each provided with a sequence number, on a Packet Data Convergence Protocol (PDCP) layer to and from a mobile station, comprising the steps of:
    detecting discontinuity of sequence numbers of packets on the PDCP layer received on an uplink;
    calculating, for each logical channel, a proportion of discarded packets on the PDCP layer to all of the packets on the PDCP layer.

5. A mobile communication system comprising:
    a plurality of mobile stations;
    a radio base station configured to perform communication with the plurality of mobile stations by using a shared channel;
    a data server configured to save data transmitted from the radio base station; and
    a monitor terminal to which the data saved in the data server are outputted; wherein
    each of the plurality of mobile stations comprises a buffer monitor/sequence number assigner configured to assign a sequence number to a packet on a Packet Data Convergence Protocol (PDCP) layer in a transmission buffer of the PDCP layer and to discard the packet on the PDCP layer, when a buffered time of the packet on the PDCP layer in the transmission buffer exceeds a predetermined threshold,
    the radio base station comprises:
    a RLC/PDCP (Radio Link Control/Packet Data Convergence Protocol) processor configured to detect discontinuity of sequence numbers of packets on the PDCP layer received on an uplink from the plurality of mobile stations;
    a calculator unit configured to calculate, for each logical channel, a proportion of discarded packets on the PDCP layer to all of the packets on the PDCP layer; and
    a reporter unit configured to report the proportion to the data server; and
    the data server comprises:
    a saver unit configured to save the proportion as a statistical value; and
    an output unit configured to output the proportion to the monitor terminal.

* * * * *